United States Patent Office 3,037,998
Patented June 5, 1962

3,037,998
BIS (ACETALDEHYDE) BIS (THREONINATO) COPPER AND PROCESS OF PREPARATION THEREOF
Kiichi Fujii, Ukyo-ku, Kyoto, Mutsuo Oda, Suita-shi, Junichiro Arita, Moriguchi-shi, and Kango Sakai and Mikio Takeda, Higashiyodogawa-ku, Osaka, Japan, assignors to Tanabe Seiyaku Co., Ltd., Higashi-ku, Osaka, Japan, a corporation of Japan
No Drawing. Filed May 20, 1959, Ser. No. 814,375
Claims priority, application Japan Oct. 1, 1958
8 Claims. (Cl. 260—438)

This invention relates to a novel chemical compound produced as an intermediate in the synthesis of DL-threonine, and to a method of preparation thereof.

Threonine is the threo-type stereoisomeric racemate of α-amino-β-hydroxybutyric acid, the other allo-type racemate being known as allothreonine.

It has been known that α-amino-β-hydroxybutyric acid can be prepared in fairly good overall yield from relatively inexpensive starting materials, but these methods have been unsatisfactory for manufacturing purposes in view of the fact that the product obtained is a mixture of the two stereoisomeric racemates, since the isolation of threonine from this mixture is quite difficult and costly.

The present invention overcomes this difficulty, it being among the objects of this invention to provide a method for preparing a novel intermediate useful in the synthesis of threonine, which method results in high purity of threo-type diastereoisomer.

In accordance with this invention we have discovered a procedure whereby bis(acetaldehyde)bis(threoninato) copper is obtained which can be led to pure threonine on removal of the acetaldehyde and copper radicals. The preferred practice of this invention comprises the steps of reacting bis(glycinato) copper upon acetaldehyde or other lower alkyl aldehyde in the presence of an alkaline catalyst in such a manner that the molar ratio of acetaldehyde is at least four times the bis(glycinato) copper, in order to produce bis(acetaldehyde)bis(threoninato) copper and recovering the product in pure form. The reaction is carried out by incorporating the reactants in the above mentioned ratio in a solvent medium such as water, methanol, ethanol and mixtures thereof which contain an alkaline catalyst such as sodium hydroxide, potassium hydroxide, sodium carbonate and potassium carbonate and by heating the mixture at a temperature of 50° to 80° C. for a few hours. Alternatively, the required amount of acetaldehyde may be added in portions to the reaction mixture two or more times during the progress of the reaction.

The resulting bis(acetaldehyde)bis(threoninato) copper represented by the following formula:

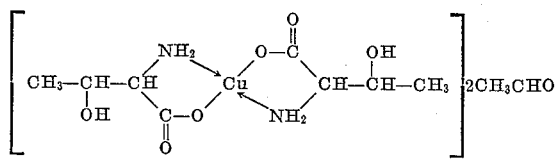

is relatively insoluble in water, while the other corresponding allothreonine compound is soluble in water. When the reaction is carried out in water, isolation of said coordination compound of threonine, which is substantially pure, may be accomplished by crystallization from the reaction mixture.

The reaction in an organic solvent such as methanol and ethanol results in formation of the corresponding solvent solution of both bis(acetaldehyde)bis(threoninato) copper and its allo-type isomer. When the solution is concentrated to dryness and the residue is extracted with water, purified bis(acetaldehyde)bis(threoninato) copper is recovered by filtration and the other allothreonine compound is dissolved in the filtrate.

Free purified threonine may be prepared by removing copper and acetaldehyde from the purified intermediate. This step is conveniently carried out by bubbling hydrogen sulfide gas into an aqueous suspension of the intermediate. Then the treated mixture is filtered to remove copper sulfide, and the filtrate is concentrated. When a large amount of absolute methanol is added to this concentrate, purified threonine crystallizes.

This procedure can be conducted either by employing a cation exchange resin alone or in conjunction with said hydrogen sulfide. Thus free threonine is prepared by passing a solution of the intermediate in aqueous ammonia through a column of cation exchange resin, such as Amberlite IR–120, which is preliminarily treated with aqueous ammonia, by concentrating the passed solution and by adding absolute methanol, whereupon the purified threonine crystallizes.

Example 1

A suspension of 105 grams (0.5 mol) of bis(glycinato) copper in 850 cc. of methanol is incorporated into a solution of 10 grams of potassium hydroxide in 180 cc. of methanol. To the mixture, 140 cc. (2.5 mols) of acetaldehyde is added and then the mixture is heated at 60° C. for one hour under stirring. Particles of bis(glycinato) copper disappear as the reaction progresses. The mixture is filtered to remove insoluble matter. To the filtrate, 11 grams of acetic acid is added and it is then concentrated to dryness under reduced pressure. The residue is extracted with 150 cc. of water, washed with water and dried. 92.7 grams of bis(acetaldehyde)bis(threoninato) copper which contains almost no allo-type diastereoisomer is obtained.

Analysis.—Calculated for $C_{12}H_{24}O_8N_2Cu$: C, 37.13; H, 6.24; N, 7.23; Cu, 16.39. Found: C, 36.87; H, 6.06; N, 7.48; Cu, 16.39.

This product is suspended in 500 cc. of water containing 1.2 grams of acetic acid. In this suspension, hydrogen sulfide gas is bubbled until the blue color of the suspension disappears. The resulting solution is filtered to remove the precipitate and the filtrate is concentrated into ⅕ of the original volume. To the concentrate, 400 cc. of methanol is added and crystallized DL–threonine is collected. 48.4 grams of DL–threonine which decomposes at 237° C. is obtained after recrystallization of the product from diluted methanol. The product shows 100% DL–threonine by bioassay and no allothreonine spot appears on paper chromatography.

Example 2

A suspension of 58 grams (0.25 mol) of bis(glycinato) copper in 600 cc. of water, 150 cc. of 4% aqueous solution of potassium hydroxide and 67 grams (1.5 mol) of acetaldehyde is heated at 62° C. for one hour under stirring. The reaction mixture is filtered to remove insoluble matter. To the filtrate, 6.5 grams of acetic acid and 44 grams (1 mol) of acetaldehyde are added under stirring and the mixture is allowed to stand for crystallization. 30 grams of bis(acetaldehyde)bis-(threoninato) copper are obtained by filtering, washing with water and drying. The product is substantially free from the allothreonine compound.

Example 3

A suspension of 58 grams (0.25 mol) of bis(glycinato) copper in 200 cc. of water, 100 cc. of 4% aqueous solution of potassium hydroxide and 67 grams (1.5 mol) of acetaldehyde are heated at 62° C. for 1 hour under stirring. The reactants are thoroughly dissolved on starting, but after the reaction is completed, a part of the reaction product has separated. To the mixture, 4.5 grams of acetic acid and 22 grams (0.5 mol) of acetaldehyde are added under stirring and the mixture is allowed to stand for crystallization. 52 grams of bis(acetaldehyde)bis-(threoninato) copper which is assayed as containing 90% threo-type isomer is obtained by filtering, washing with water and drying. Extraction of the product with water results in 40 grams yield of 100% bis(acetaldehyde)bis(threoninato) copper.

What is claimed is:

1. Bis(acetaldehyde)bis(threoninato) copper.

2. A process for preparing bis(acetaldehyde)bis-(threoninato) copper which comprises the steps of reacting bis(glycinato) copper with acetaldehyde in the presence of an alkaline catalyst, the molar ratio of acetaldehyde being at least about four times the bis(glycinato) copper, in order to produce bis(acetaldehyde)bis(threoninato) copper.

3. A process for preparing bis(acetaldehyde)bis-(threoninato) copper which comprises the steps of reacting an aqueous solution of bis(glycinato) copper with acetaldehyde in the presence of an alkaline catalyst, the molar ratio of acetaldehyde being at least about four times the bis(glycinato) copper, in order to produce bis-(acetaldehyde)bis(threoninato) copper.

4. A process for preparing bis(acetaldehyde)bis-(threoninato) copper which comprises the steps of reacting a solution in a volatile organic solvent of bis(glycinato) copper with acetaldehyde in the presence of an alkaline catalyst, the molar ratio of acetaldehyde being at least about four times the bis(glycinato) copper, in order to produce bis(acetaldehyde)bis(threoninato) copper.

5. A process for preparing bis(acetaldehyde)bis-(threoninato) copper which comprises the steps of reacting a solution in a volatile organic solvent taken from the class consisting of methanol and ethanol of bis-glycinato) copper with acetaldehyde in the presence of an alkaline catalyst, the molar ratio of acetaldehyde being at least about four times the bis(glycinato) copper, in order to produce bis(acetaldehyde)bis(threoninato) copper.

6. A process for preparing bis(acetaldehyde)bis-(threoninato) copper which comprises the steps of reacting bis(glycinato) copper with acetaldehyde in the presence of an alkaline catalyst selected from the group consisting of alkali metal hydroxides and carbonates, the molar ratio of acetaldehyde being at least about four times the bis(glycinato) copper, in order to produce bis-(acetaldehyde)bis(threoninato) copper.

7. A process for preparing bis(acetaldehyde)bis-(threoninato) copper which comprises the steps of reacting an aqueous solution of bis(glycinato) copper with acetaldehyde in the presence of an alkaline catalyst, the molar ratio of acetaldehyde being at least about four times the bis(glycinato) copper, in order to produce bis(acetaldehyde)bis(threoninato) copper, and separating the water-insoluble product from the solution.

8. A process for preparing bis(acetaldehyde)bis-(threoninato) copper which comprises the steps of reacting a solution in a volatile organic solvent of bis-(glycinato) copper with acetaldehyde in the presence of an alkaline catalyst, the molar ratio of acetaldehyde being at least about four times the bis(glycinato) copper, in order to produce bis(acetaldehyde)bis(threoninato) copper, evaporating said organic solvent, extracting the reaction mass with water, and separating the water-insoluble product from the solution.

References Cited in the file of this patent
UNITED STATES PATENTS 2,278,965    Van Peski et al.  _____ Apr. 7, 1942

OTHER REFERENCES

Mukherjie et al.: Journal of the Indian Chemical Society (1955), vol. 32, pp. 581 to 588. (Abstracted in Chemical Abstracts, vol. 50, col. 11,973.)